United States Patent [19]

Wilkinson

[11] Patent Number: 4,586,082
[45] Date of Patent: Apr. 29, 1986

[54] ERROR CONCEALMENT IN DIGITAL TELEVISION SIGNALS

[75] Inventor: James H. Wilkinson, Tadley, near Basingstoke, United Kingdom

[73] Assignee: Sony Corporation, Tokyo, Japan

[21] Appl. No.: 495,684

[22] Filed: May 18, 1983

[30] Foreign Application Priority Data

May 26, 1982 [GB] United Kingdom ............... 8215359

[51] Int. Cl.[4] .................................... H04N 5/14
[52] U.S. Cl. ............................. 358/160; 358/163; 358/167; 358/336; 382/52
[58] Field of Search ............... 358/160, 163, 166, 167, 358/21 R, 37, 280, 282, 30, 39, 40, 314, 336; 382/52, 54; 360/38.1; 371/24, 30, 65

[56] References Cited

U.S. PATENT DOCUMENTS

| | | | |
|---|---|---|---|
| 4,199,780 | 4/1980 | Taylor | 358/167 |
| 4,381,519 | 4/1983 | Wilkinson et al. | 358/314 |
| 4,419,693 | 12/1983 | Wilkinson | 358/336 |
| 4,470,065 | 9/1984 | Reitmeier | 358/21 R |
| 4,485,399 | 11/1984 | Schulz et al. | 358/314 |
| 4,498,104 | 2/1985 | Schulz | 358/21 R |

*Primary Examiner*—Tommy P. Chin
*Assistant Examiner*—Michael D. Parker
*Attorney, Agent, or Firm*—Lewis H. Eslinger; Alvin Sinderbrand

[57] ABSTRACT

A method of concealing errors in a digital television signal formed by a plurality of sample signals corresponding respectively to sample positions along a horizontal scan line of a television picture made up of a plurality of such lines, comprises, in respect of each sample signal which is in error, selecting from a plurality of algorithms a preferred algorithm for correcting the error sample signal, calculating a corrected value of the error sample signal using the preferred algorithm, and substituting the corrected sample signal for the error sample signal so as to conceal the error. The algorithms may be four in number and use sample values located along the horizontal, vertical and two diagonal directions respectively to predict the known sample values at sample positions adjacent to the position of the error sample signal, the algorithm giving the best result being selected. When the density of other error sample signals in the neighborhood of the error sample signal prevents the selection of the preferred algorithm, the sample signal from a predetermined or a selected position in the television picture adjacent to the position of the error sample signal is substituted for the error sample signal so as to conceal the error.

24 Claims, 6 Drawing Figures

ERROR CONCEALMENT IN DIGITAL TELEVISION SIGNALS

BACKGROUND OF THE INVENTION

1. Field of the Invention

This invention relates to error concealment in digital television signals.

2. Description of the Prior Art

Recently there has been an increasing interest in the use of digital techniques for television signals. Such techniques are, for example, used in some video tape recording arrangements where an incoming television signal to be recorded is sampled, the samples are coded into digital form, the digital data signals are recorded and subsequently reproduced by a video tape recorder (VTR), the reproduced digital data signals are decoded, and the decoded signals are used to form an analog signal corresponding to the original television signal.

If errors occur in the handling of the digital signals, for example due to noise or drop-out occurring in the VTR, the digital signals are lost or corrupted and then the reformed television signal does not correspond exactly to the original television signal, and a resulting television picture is degraded.

There are two main approaches to dealing with errors in digital television signals. The first approach is correction, which involves the production and use of additional data signals purely for the purposes of error detection and correction, these additional data signals otherwise being redundant. While correction provides good results, it cannot generally be used as the sole means of dealing with errors, because a comprehensive correction capability would require an excessive amount of additional data which might overload the data handling paths or raise the data rate to an unacceptable level. The second approach, with which the present invention is more particularly concerned, is concealment. This comprises the replacement of corrupted data signals by data signals generated using available uncorrupted data signals. This method relies largely for accuracy on the strong correlation that exists in a television signal.

In our co-pending UK patent application No. 8011090 (Ser. No. 2073534), the corresponding co-pending European patent application No. 81301156.6 (Ser. No. 0037212), and corresponding U.S. Pat. No. 4,419,693 we have disclosed a method of error concealment which comprises selecting from a plurality of algorithms a preferred algorithm for calculating a corrected value for use in concealment of an error sample, calculating a corrected value for the sample using the preferred algorithm, and replacing the error sample by the corrected value sample. This method works well at the normal reproduction speed, but when reproducing at higher speeds the loss and corruption of reproduced signals as a reproducing head crosses recorded tracks means that not only is correction substantially less effective, but so also is concealment. This is because concealment relies upon the presence of valid samples adjacent to a sample to be concealed, and if a significant number of the adjacent samples have been lost or corrupted, effective concealment is impossible. This problem will be described further below.

SUMMARY OF THE INVENTION

One object of the present invention is to provide a method of concealing errors in a digital television signal and which overcomes this problem.

Another object of the present invention is to provide a method of concealing errors in a digital television signal which is operable in the presence of a high density of error sample signals.

Another object of the present invention is to provide a method of and apparatus for concealing errors in a digital television signal by substitution of actual sample signals when the density of errors is too high to permit calculation of a sample value for substitution.

According to the present invention there is provided a method of concealing errors in a digital television signal, which television signal represents a raster comprising a plurality of component sample signals corresponding respectively to sample positions along horizontal scan lines of a television picture made up of a plurality of such lines, the method comprising, in respect of each sample signal which is in error:

selecting from a plurality of algorithms a preferred algorithm for correcting error sample signal;

calculating a corrected value of the error sample signal using the preferred algorithm;

substituting the corrected sample signal for the error sample signal so as to conceal the error; and when the density of other error sample signals in the neighborhood of the error sample signal prevents the selection of the preferred algorithm; substituting the sample signal from a position in the raster adjacent to the position of the error sample signal for the error sample signal so as to conceal the error.

According to the present invention there is also provided apparatus for concealing errors in a digital television signal, which television signal represents a raster comprising a plurality of component sample signals corresponding respectively to sample positions along horizontal scan lines of a television picture made up of a plurality of such lines, the apparatus comprising:

means operative in respect of each sample signal which is in error to select from a plurality of algorithms a preferred algorithm for correcting the error sample signal;

means for calculating a corrected value of the error sample signal using the preferred algorithm;

means for substituting the corrected sample signal for the error sample signal so as to conceal the error; and means operative when the density of other error sample signals in the neighbourhood of the error sample signal prevents the selection of the preferred algorithm, to substitute the sample signal from a position in the raster adjacent to the position of the error sample signal for the error sample signal so as to conceal the error.

The above, and other objects, features and advantages of this invention will be apparent from the following detailed description of illustrative embodiments which is to be read in connection with the accompanying drawings.

DESCRIPTION OF THE PREFERRED EMBODIMENTS

Before describing an embodiment of the invention, and to assist understanding of the embodiment, further reference will first be made to the problem mentioned above.

Figure 1:
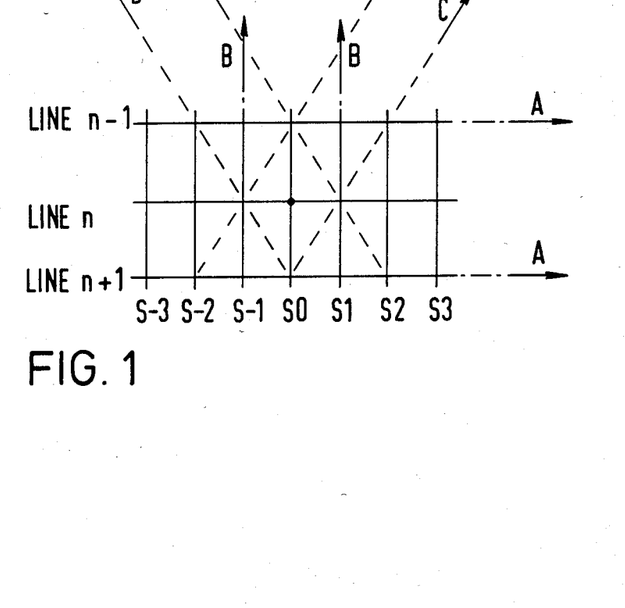
FIG. 1 shows a matrix of sample positions in a television picture.

Referring to FIG. 1, this shows part of a television raster, and in particular parts of three consecutive horizontal scan lines labelled line n−1, line n and line n+1. The sample positions are disposed at regular intervals along each of the lines, the intervals corresponding to a sampling frequency of say 13.5 MHz, and the sample positions being aligned in the vertical direction. Reading from the left, consecutive sample positions in each line are labelled S−3, S−2, S−1, S0, S1, S2 and S3. Using this notation, any sample position in the matrix can be designated by the line and the sample number, and for the purpose of this discussion it is assumed that the sample position at which there is an error sample signal requiring concealment is in line n at position S0, this being designated n, S0.

As disclosed in our above-mentioned applications, a corrected value for the sample position n, S0 could be estimated in one of four different ways. Firstly, the average could be taken of the two samples in line n adjacent to and on each side of the sample position n, S0. Secondly, the average could be taken of the two sample values in line n−1 and line n+1 adjacent to and vertically above and below the sample position n, S0. Thirdly, the average could be taken of the two sample values in line n−1 and line n+1 and on either side of the sample position n, S0 along the positive diagonal direction. Fourthly, the average could be taken of the two sample values in line n−1 and line n+1 adjacent to and on either side of the sample position n, S0 and along the negative diagonal direction. These four directions are indicated by the arrows A, B, C and D respectively.

Each of these possibilities may be thought of as an algorithm for calculating a corrected value, and it will be appreciated that it is likely that one of these algorithms will give a better result than any of the others. The direction to be used is therefore selected by testing each algorithm using known sample values to see which gives the best result, and then using a corrected value derived using the direction corresponding to that preferred algorithm when substituting a corrected value sample.

As a further refinement, the results derived from the respective algorithms can be weighted. In other words, a value can be placed on the likely accuracy of the results obtained. This is necessary because the distance between adjacent sample positions is less in the horizontal direction than in the vertical direction, the difference amounting to a factor of approximately 1.8. For this reason, the algorithm using the horizontal direction is in fact most likely to give the nearest result, with the algorithm for the vertical direction being next best, and the two algorithms for the diagonal directions being the next best.

The four algorithms referred to above will now be specified in mathematical terms. Thus, the decision of concealment direction is made by investigating the adjacent sample values and obtaining the concealment accuracy for each direction. If the concealment accuracy is H for the horizontal direction, V for the vertical direction, $D^+$ for the positive diagonal direction and $D^-$ for the negative diagonal direction, then these concealment accuracies can be defined as follows:

$$H=\tfrac{1}{2}|\tfrac{1}{2}[(n-1),S-1+(n-1),S1]-(n-1),S0|+\tfrac{1}{2}|\tfrac{1}{2}[(n+1),S-1+(n+1),S1]-(n+1),S0| \quad (1)$$

that is to say, the concealment accuracy H equals the average of the horizontal concealment accuracy from the horizontal line immediately above and the horizontal line immediately below the horizontal line containing the error sample. Likewise:

$$V=\tfrac{1}{2}|\tfrac{1}{2}[(n-1),S-1+(n+1),S-1]-n,S-1|+\tfrac{1}{2}|\tfrac{1}{2}[(n+1),S1+(n+1),S1]-n,S1| \quad (2)$$

$$D^+=\tfrac{1}{2}|\tfrac{1}{2}[(n-1),S0+(n+1),S-2]-n,S-1|+\tfrac{1}{2}|\tfrac{1}{2}[(n-1),S2+(n+1),S0]-n,S1| \quad (3)$$

$$D^-=\tfrac{1}{2}|\tfrac{1}{2}[(n-1),S-2+(n+1),S0]-n,S-1|+\tfrac{1}{2}|\tfrac{1}{2}[(n-1),S0+(n+1),S2]-n,S1| \quad (4)$$

These four values H, V, $D^+$ and $D^-$ represent the accuracy of concealment for the sample values most closely connected with the error sample. Preferably these values are each assigned a weighting coefficient to take account of the unequal spacings of the horizontal, vertical and diagonal samples. The smallest value is then used to select the direction of concealment.

The method has been described as applied to the luminance channel, that is to say concealment of errors occurring in luminance sample values. It is also necessary to consider the colour difference channels, and here two possibilities arise.

Firstly, each color difference channel can be provided with a separate concealment selection arrangement independent of the arrangement for the luminance channel.

Secondly, because the first solution referred to above increases the amount of hardware required by approximately three, an alternative method which economizes on the amount of hardware required makes use of the fact that the chrominance information is related to the luminance information. That is, where a chrominance edge exists, so usually does a luminance edge. Based on this assumption it is possible to select the direction of color difference concealment to be the same as that selected for luminance concealment. However, because the chrominance samples occur at only one half the frequency of the luminance samples along each horizontal line, a different set of weighting coefficients has to be used, these being optimized to the chrominance bandwidths.

Figure 2:
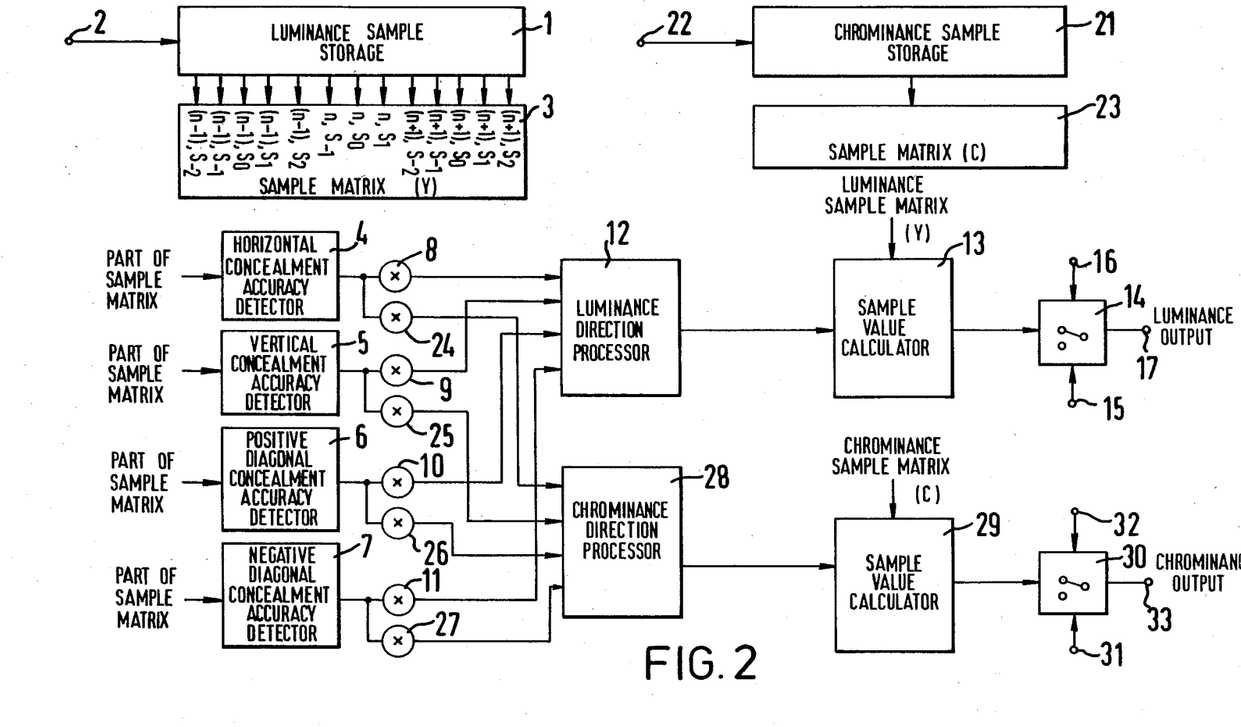
FIG. 2 shows in simplified block form apparatus for concealing errors in a digital television signal.

Referring to FIG. 2, this shows apparatus for concealing errors in a digital television signal. The apparatus comprises a luminance sample storage means 1 to which luminance input samples are supplied by way of an input terminal 2. The luminance sample storage means 1 supplies outputs to a luminance sample matrix storage means 3 which stores a moving matrix of sample values corresponding to the sample positions (n+1),S2; (n+1),S1; (n+1),S0; (n+1),S−1; (n+1),S−2; n,S1; n,S0; n,S−1; (n−1),S2; (n−1),S1; (n−1),S0; (n−1),S−1; and (n−1),S−2.

Four concealment accuracy detectors are provided, these being a horizontal concealment accuracy detector 4, a vertical concealment accuracy detector 5, a positive diagonal concealment accuracy detector 6 and a negative diagonal concealment accuracy detector 7. Each of the concealment accuracy detectors 4 to 7 is continuously supplied with the appropriate part of the sample matrix from the luminance sample matrix storage means 3. Thus the horizontal concealment accuracy detector 4, for example, receives or selects the sample values necessary to calculate the concealment accuracy H using algorithm (1) above, and supplies a signal representing the concealment accuracy H by way of a weighting multiplier 8 to a luminance direction processor 12. Likewise the concealment accuracy detectors 5 to 7 supply a respective signal representing the vertical concealment accuracy V, the positive diagonal concealment accuracy $D+$ and the negative diagonal concealment accuracy $D-$ by way of weighting multipliers 9, 10 and 11 respectively to the luminance direction processor 12. The weighting multipliers 8 to 11 effect the weighting referred to above to compensate for the different distances between adjacent sample positions in the various directions. The weighting may be done simply on the basis of distance between adjacent sample positions, in which case each weighting multiplier multiplies by the reciprocal of the distance between adjacent sample positions in the relevant direction. Other weightings can, however, be used.

The luminance direction processor 12 supplies an output signal representing the selected direction of concealment to a sample value calculator 13 which operates to select the appropriate samples from the luminance sample matrix storage means 3 and calculate therefrom the required concealment value to be used to conceal the error sample. For example, if the horizontal direction is selected, the sample value calculator 13 uses the sample values for the sample positions n,S−1 and n,S1 to calculate the value to be used to conceal the error sample at the sample position n, S0. The concealment value is supplied to a selector 14 to which a switching signal is supplied by way of a terminal 15. The selector 14 is also supplied with the sample value from the sample position n,S0 by way of a terminal 16.

Preferably the apparatus as so far described operates continuously, that is to say concealment values are determined as described for every sample position and supplied to the selector 14. Only, however, when it has been determined that there is an error at a given sample position n,S0, is a signal supplied to the selector 14 by way of the terminal 15, whereupon the concealment value supplied from the calculator 13 is supplied to a luminance output terminal 17 in place of the sample value supplied by way of the terminal 16. At all other times, the sample value supplied by way of the terminal 17 is supplied to the luminance output terminal 17.

The fact that there is an error at a given sample position n,S0 can be determined in any suitable manner. For example, it may be determined that the data word representing the sample value is not valid. As a more specific example, suppose that each sample value is coded into a word in the sub-set of 10-bit words which consist of 5 "0" and 5 "1"; this being convenient for magnetic recording and reproduction because of the large number of transients and the ease of clock recovery. In this case any reproduced data word not having 5 "0" and 5 "1" is not a valid member of the sub-set and so is clearly an error. Thereupon a switching signal is supplied to the terminal 15.

The apparatus may also include arrangements for calculating concealment values for the color difference channels U and V. For simplicity, only that part of the apparatus necessary to calculate concealment values for the difference channel U is shown and will be described. For this purpose the apparatus comprises a chrominance sample storage means 21 to which chrominance input samples are supplied by way of an input terminal 22. The chrominance sample storage means 21 supplies outputs to a chrominance signal matrix storage means 23 which stores a moving matrix of sample values corresponding to those listed above in connection with the luminance sample matrix storage means 3, but adjusted to take account of the different spacing between adjacent chrominance samples.

Operating in time division multiplex for the luminance and chrominance samples respectively, the concealment accuracy detectors 4 to 7 derive signals representing the horizontal, vertical, positive diagonal and negative diagonal concealment accuracies H, V, $D+$ and $D-$ for the chrominance difference channel U and supply the signals by way of respective chrominance weighting multipliers 24, 25, 26 and 27 to a chrominance direction processor 28 which supplies an output signal representing the selected direction of concealment to a sample value calculator 29 which operates to select the appropriate samples from the chrominance sample matrix storage means 23 and calculate therefrom the required concealment value to be used to conceal the error sample. The concealment error is supplied to a selector 30 to which a switching signal is supplied by way of a terminal 31. The selector 30 is also supplied with the sample value from the sample position n,S0 by way of a terminal 32.

As with the luminance part of the apparatus, the chrominance part of the apparatus preferably operates continuously. Only, however, when it has been determined there is an error at a given sample position n,S0, is a signal supplied to the selector 30 by way of the terminal 31, whereupon the concealment value supplied from the calculator 29 is supplied to a chrominance output terminal 33 in place of the sample value supplied by way of the terminal 32.

The chrominance part of apparatus may be duplicated for the color difference channel V or alternatively hardware can be saved by also using the algorithm selected for the color difference channel U for the color difference channel V.

The method described above may be modified as described in our copending UK patent application No. 8214086 (corresponding to U.S. application Ser. No. 494,324 filed May 13, 1983), to steer the algorithms used to avoid samples known to be in error when calculating sample values for replacement.

Briefly, this is done by calculating each of the concealment accuracies defined by expressions (1) to (4) in two component parts corresponding respectively to the first and second lines of each of expressions (1) to (4). Any calculations involving the use of an error sample is rejected so, depending on the density of errors, a concealment accuracy may be calculated using sample values on one side or the other side or both sides of the sample to be concealed. With this modified method therefore the algorithms are steered to avoid error samples using the fact that eight different calculations for concealment accuracies are available.

Thus, in embodiments of the invention, in calculating a corrected value sample no direction of concealment is used if the resulting calculation involves the use of an error sample. In the present discussion it will be assumed that all error samples are identified as such by having an error flag, generally an additional bit "1", attached to the data word representing that sample. However, it is not necessary to exclude a direction of concealment merely because the concealment accuracy H, V, $D^+$ or $D^{-+}$ as set out above is invalidated by one or more error samples.

Consider, for example, the horizontal concealment accuracy H which is calculated from the above algorithm (1) repeated here:

$$H = \tfrac{1}{2}|\tfrac{1}{2}[(n-1),S-1+(n-1),S1]-(n-1),S0| + \tfrac{1}{2}|\tfrac{1}{2}[(n+1),S-1+(n+1),S1]-(n+1),S0| \quad (1)$$

This algorithm can be viewed as the sum of two component algorithms respectively bounded by the magnitude signs and it is possible for one of these component algorithms to be invalidated by one or more error samples, while the other component algorithm remains valid. Thus either of the component algorithms may be dropped in favor of the other in appropriate cases, and this results in two further algorithms for the horizontal concealment accuracy, as follows:

$$H_1 = |\tfrac{1}{2}[(n-1),S-1+(n-1),S1]-(n-1),S0| \quad (5)$$

and $$H_2 = |\tfrac{1}{2}[(n+1),S-1+(n+1),S1]-(n+1),S0| \quad (6)$$

Figure 5:
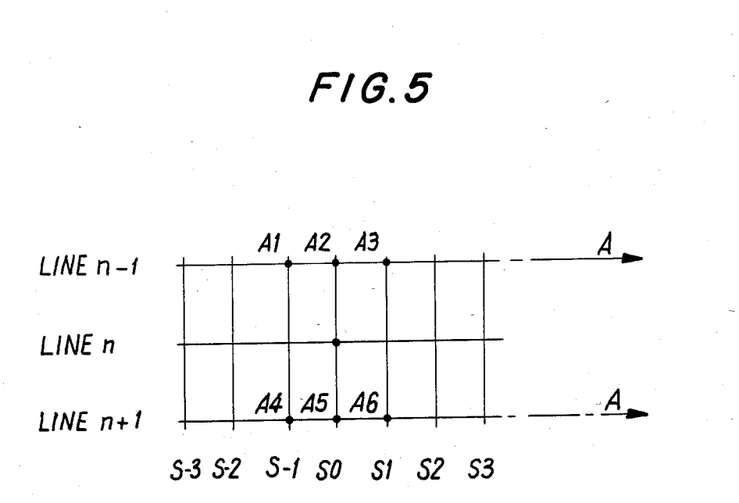
FIG. 5 is a diagram of a matrix of samples in a television picture.

For ease of subsequent consideration actual values will be ascribed to each sample position as indicated in FIG. 5. Using these values the modified horizontal concealment accuracies can be more simply expressed as:

$$H_1 = |\tfrac{1}{2}(A1+A3)-A2| \quad (7)$$

and $$H_2 = |\tfrac{1}{2}(A4+A6)-A5| \quad (8)$$

This approach can be similarly applied to the other concealment accuracies V, $D^+$ and $D^-$, for which modified concealment accuracies are derived as follows:

$$V_1 = |\tfrac{1}{2}[(n-1),S-1+(n+1),S-1]-n,S-1| \quad (9)$$

and $$V_2 = |\tfrac{1}{2}[(n-1),S1+(n+1),S1]-n,S1| \quad (10)$$

$$D_1^+ = |\tfrac{1}{2}[(n-1),S0+(n+1),S-2]-n,S-1| \quad (11)$$

and $$D_2^+ = |\tfrac{1}{2}[(n-1),S2+(n+1),S0]-n,S1| \quad (12)$$

$$D_1^- = |\tfrac{1}{2}[(n-1),S-2+(n+1),S0]-n,S-1| \quad (13)$$

and $$D_2^- = |\tfrac{1}{2}[(n-1),S0+(n+1),S2]-n,S1| \quad (14)$$

Use of these modified concealment accuracies has little effect on the frequency response of the method. Obviously the modified concealment accuracies are slightly less dependable, and this is particularly so when the sample space contains a discrete picture feature.

The method is implemented in practice by calculating from the sample values available each of the modified concealment accuracies. For example, for the horizontal direction the modified concealment accuracies $H_1$ and $H_2$ are calculated, but if either calculation involves the use of an error sample then that modified concealment accuracy is rejected. If neither is rejected, that is if no error sample is present among those used in these calculations, then the full horizontal concealment accuracy is calculated from:

$$H = \tfrac{1}{2}(H_1+H_2) \quad (15)$$

Figure 6:
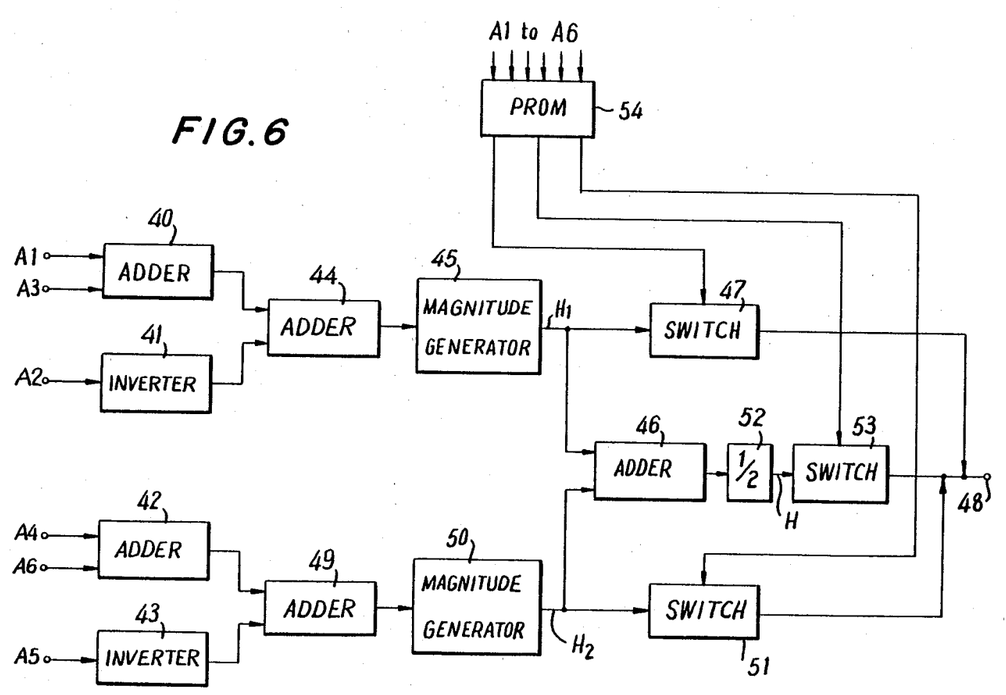
FIG. 6 is a more detailed block diagram of a portion of FIG. 2.

These calculations are performed continuously and are most conveniently performed in the concealment accuracy detectors 4 to 7 of the apparatus of FIG. 2. FIG. 6, to which reference is now made, shows the necessary parts of horizontal concealment accuracy detector 4, the arrangements for the other concealment accuracy detectors 5, 6 and 7 being similar.

The sample values $A_1$ and $A_3$ are supplied to an averager 40, the sample value $A_2$ is supplied to an inverter 41, the sample values $A_4$ and $A_6$ are supplied to an averager 42, and the sample value $V_5$ is supplied to an inverter 43. The averager 40 forms the sum $\tfrac{1}{2}(A_1+A_3)$ which is supplied to an adder 44, as is the output of the inverter 41. The adder 44 thus forms the sum $\tfrac{1}{2}(A_1+A_3)-A_2$ which is supplied to a magnitude generator 45, the output of which is the horizontal concealment accuracy $H_1$ of expression (7), and this is supplied to an adder 46 and by way of a switch 47 to an output terminal 48. The averager 42 forms the sum $\tfrac{1}{2}(A_4+A_6)$ which is supplied to an adder 49, as is the output of the inverter 43. The adder 49 thus forms the sum $\tfrac{1}{2}(A_4+A_6)-A_5$ which is supplied to a magnitude generator 50, the output of which is the horizontal concealment accuracy $H_2$ of expression (8), and this is supplied to the adder 46 and by way of a switch 51 to the output terminal 48. The adder 46 forms the sum $H_1+H_2$ which is halved in a divider circuit 52 to form the full horizontal concealment accuracy H of expressions (1) and (15), and this is supplied by way of a switch 53 to the output terminal 48. The switches 47, 51 and 53 are controlled by respective outputs from a programmable read-only memory (PROM) 54. The error flags of the sample values $A_1$ to $A_6$ are also supplied to the PROM 54.

The operation is as follows. If there are no error samples among the sample values $A_1$ to $A_6$ the PROM 54 opens the switch 53 and closes the switches 47 and 51. If there are error samples among the sample values $A_1$ to $A_3$ but not among the sample values $A_4$ to $A_6$, the PROM 54 opens the switch 51 and closes the switches 47 and 53. If there are error samples among the sample values $A_4$ to $A_6$ but not among the sample values $A_1$ to $A_3$, the PROM 54 opens the switch 47 and closes the switches 51 and 53. If there are error samples among the sample values $A_1$ to $A_3$ and among the sample values $A_4$ to $A_6$, the PROM 54 closes the switches 47, 51 and 53.

So far as the succeeding stages of the apparatus of FIG. 2 are concerned, the operation is the same whether the horizontal concealment accuracy supplied to the output terminal 48 is H, $H_1$, or $H_2$. If none of these is supplied then the horizontal direction of concealment is rejected and the direction of concealment is selected from the remaining three directions.

Similar apparatus is provided for the other three directions of concealment and operates in a similar way to derive the concealment accuracies V, D+ and D− of expressions (2) to (4), and $V_1$, $V_2$, $D_1{}^+$, $D_2{}^+$, $D_1{}^-$ and $D_2{}^-$ of expressions (9) to (14).

If the density or error samples is so large that none of the above twelve concealment accuracies are supplied, that is, all the concealment algorithms involve error samples, then the apparatus may be arranged to fall back on using the horizontal direction, because in general this is the direction most likely to give the best result. Alternatively concealment may be based on some different approach such as using sample values from corresponding positions in a preceding field of the television signal.

Various modifications and changes are of course possible. For example, it is not essential to use concealment accuracies for all four of the directions mentioned above, and some different number, such as two may be used in some embodiments.

During reproduction at normal speed the method described above or the modified method mentioned above works well, because at least some valid samples are generally available adjacent to any sample needing concealment. Moreover, the probability of valid adjacent samples being available can be increased by shuffling the order of the samples before recording or transmission and de-shuffling after reproduction or reception, this dispersing any sequence of lost or corrupted samples resulting from a short drop-out. When high speed shuttle modes of reproduction are used, that is where the tape transport speed is varied over a wide range from a multiple of (say up to twenty times) the normal speed in the forward direction to a similar speed in the reverse direction, very severe loss and corruption of reproduced sources inevitably occurs due to the reproducing head crossing from recording track to recording track rather than correctly tracing each recording track in sequence. This results in noise bars on the reproduced picture.

This problem can be alleviated to some extent by including a field store to provide replacement samples on the time axis. In the field store are stored, as available, correct samples or corrected samples, or failing that the above corrected values forming concealment samples. The data for each sample position is up-dated as and when possible by over-writing the new data in the respective sample positions. Each recently entered data word has a flag bit attached to it indicating that it is recent data. Particularly at the higher reproduction speeds such up-dating will become infrequent at least for some sample positions, and because normally whole blocks of data words are lost and because the shuffling and de-shuffling process normally used disperses the individual words of each such block over the picture area, the resulting effect on the reproduced picture is called "trailing dots". Quite simply, the effect is due to old data being used at some of the sample positions. The trailing dots effect is particularly objectionable in the case of a reproduced picture containing any rapid movement, and results in a very hazy image.

In embodiments of the present invention this problem is alleviated by the use of at least the first of two further measures, these being; sample replacement in one direction, which can be modified to include the step of selecting the direction, and limiting the number of successive samples replaced.

Figure 3:
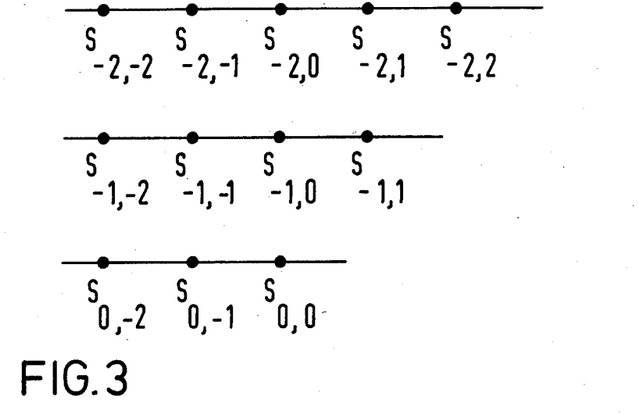
FIG. 3 shows another matrix of sample positions in a television picture.

Sample replacement will first be described with reference to FIG. 3 which shows part of a television raster, and in particular the sample positions in parts of three consecutive horizontal scan lines as they appear on the picture raster. $S_{0,0}$ designates the current sample position in respect of which a sample value is about to be written into the field store, $S_{0,-1}$ and $S_{0,-2}$ the two previous samples in the same line, $S_{-1,0}$ the corresponding sample in the previous line, and so on.

When the previously described sample concealment using algorithms is not possible because of the high density of error samples, for example in the shuttle mode, then sample replacement is used. In general, sample replacement from any one of four points is possible, these being the sample values at those four of the adjacent sample positions in respect of which sample values have already been written into the field store. Thus if sample replacement is required at the same position $S_{0,0}$, then the replacement sample value used may be taken from $S_{0,-1}$, $S_{-1,-1}$, $S_{-1,0}$ or $S_{-1,1}$. Of these, the sample value at $S_{0,-1}$ will generally give the best result, and the system may operate always to replace from that position, that is from the immediately preceding sample position in the same line. In some cases this may need to be modified to replacement from a preceding sample position, rather than the immediately preceding sample position, in the same line. For example, in some cases where the samples are shuffled in order prior to recording or transmission and are de-shuffled on reproduction or reception, it is the practice after de-shuffling to add error flags to the two samples in the same line positioned one on each side of any sample having an error flag. In such a case the system may operate always to replace from the immediately preceding sample position but one in the same line, that is, from the position $S_{0,-2}$. However, the system may alternatively always operate to replace from some other adjacent position, and this alternative may in some circumstances give better results.

In all these cases the trailing dots problem is substantially eliminated because the effect of "smearing" the samples in time is avoided. That is to say, the replacement samples used are up-to-date and are displaced in space rather than being out-of-date samples in the correct position. While therefore there is some loss of resolution, the resulting television picture is dynamically more acceptable. This is particularly important when a high speed shuttle mode is being used to search for a particular piece of action.

As indicated above, the sample replacement process can operate in an adaptive manner by including the step of selecting the direction used for sample replacement, rather than always replacing from the same predetermined direction.

In this case, using principles similar to those used in the adaptive concealment described above, a decision process can be used to estimate the preferred direction to be used for sample replacement. Considering, as before, the horizontal, vertical, positive diagonal and negative diagonal directions (A, B, C and D respectively in FIG. 2), then respective accuracy factors $E_H$, $E_V$, $E_{D+}$ and $E_{D-}$ can be calculated as follows:

$$E_H = |K_H[S_{0,-2} - S_{0,-1}]/K_h| \tag{16}$$

$$E_V = |K_V[S_{-2,0} - S_{-1,0}]/K_v| \tag{17}$$

$$E_{D+} = |K_D[S_{-2,2} - S_{-1,1}]/K_{d+}| \quad (18)$$

$$E_{D-} = |K_D[S_{-2,-2} - S_{-1,-1}]/K_{d-}| \quad (19)$$

where:

$K_H$, $K_V$ and $K_D$ are respective spatial weighting coefficients which are proportional to the distances between the two sample positions used in the respective expression (5), (6) or (7) and (8), and $K_h$, $K_v$, $K_{d+}$ and $K_{d-}$ are respective error weighting coefficients.

The lowest value of accuracy factor $E_H$, $E_V$, $E_{D+}$ or $E_{D-}$ determines the direction to be used for sample replacement.

The error weighting coefficients $K_h$, $K_v$, $K_{d+}$ and $K_{d-}$ are evaluated from the following decision table, which is given for the horizontal error weighting coefficient $K_h$, and the adaption of the decision table for the other three error weighting coefficients will be readily apparent:

| Decision Table | | |
|---|---|---|
| $S_{0,-2}$ | $S_{0,-1}$ | Decision |
| 1 | 1 | $K_h = 1$ |
| 1 | 0 | $K_h = 0.25$ |
| 0 | 1 | $K_h = 0.25$ |
| 0 | 0 | $K_h = 0$ | where:
0 indicates an error
1 indicates no error.

The values of K given in the last column are generally predetermined, but can be adjusted to suit particular systems or circumstances. If the result is that all of $K_h$, $K_v$, $K_{d+}$ and $K_{d-}$ are zero, then the horizontal direction is used for sample replacement.

Finally, as mentioned above, a limit can be placed on the number of successive samples that are replaced. Thus, if, for example, replacement is being effected using the preceding sample in the same line, then if a succession of incoming samples to the field store have error flags, then the same sample value will be successively used in a sequence of sample positions, extending along a horizontal scan line until such time as an incoming sample not having an error flag is received. The result as seen on the television picture is particularly objectionable if this occurs at the beginning of a horizontal scan line, because the first replacement sample will be taken from the front porch (the synch signal not being present in the digitized signal), and the consequence will be a black line extending across the television picture.

To overcome this problem a counter is provided to count successive sample replacements, the counter being reset to zero each time a non-error sample value is accepted into the field store. When the count in the counter reaches a predetermined value, for example, ten, replacement of the sample is inhibited, and the counter is reset to zero. The consequence of this is that instead of using an up-to-date but spatially displaced sample value as a replacement for the error sample, the out-of-date sample value for that same position and already in the field store is used.

Alternatively, the counter may not be reset at the count of ten, but may remain at ten until reset by an incoming non-error sample. In other words, once started, use of the previous field sample values continues until a valid current-field sample is received.

Figure 4:
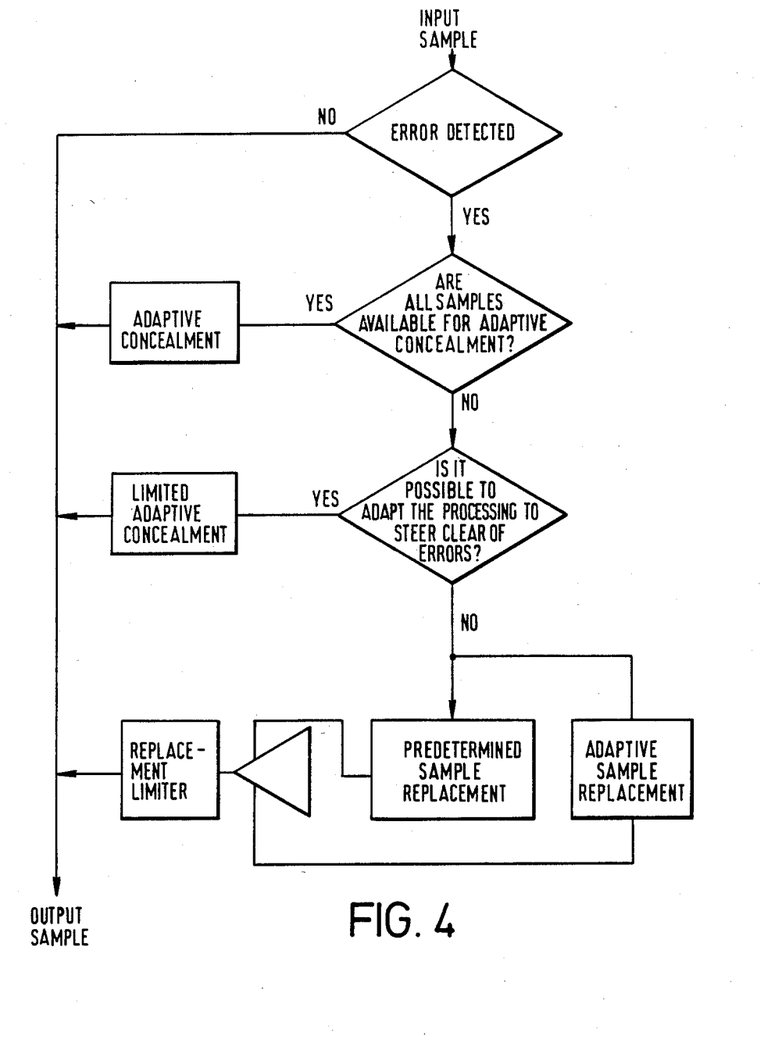
FIG. 4 shows a decision tree for a method according to the invention.

FIG. 4, to which reference is now made, shows the decision tree for the total concealment process. The decisions referred to are made by a programmable read-only memory which may conveniently be incorporated in or perform the functions of the luminance sample matrix storage means 3 of FIG. 2. For each input sample to the field store the first decision step is to determine whether the sample has an error flag or not. If not, the input sample itself is used as the output sample and is written at the appropriate address in the field store. If the input sample has an error flag then the process passes to the second decision step.

In the second decision step a decision is made as to whether all the samples are available for adaptive concealment as described above in connection with expressions (1) to (4). If therefore the samples are available, then this form of adaptive concealment is used and the algorithms are used to determine the preferred direction for calculating a corrected sample value to be substituted for the input sample and written at the appropriate address in the field store. If not all the samples are available for adaptive concealment in this way then the process passes to the third decision step.

In the third decision step a decision is made as to whether the algorithms used for calculating the concealment accuracies can be steered clear of errors as outlined above and as described in detail in our above-mentioned copending UK patent application No. 8214086 (corresponding to U.S. application Ser. No. 494,324). If the algorithms, or at least one of them can be steered to avoid error samples, then limited adaptive concealment is possible and a sample value is calculated using the direction determined from the available concealment accuracy or accuracies and this calculated sample value is used to replace the input sample and is written at the appropriate address in the field store. If the error density is such that it is not possible to steer the algorithms clear of error samples, then sample replacement as described above is used.

As indicated in the decision tree, sample replacement may be either predetermined or adaptive sample replacement. In the case of predetermined sample replacement the replacement is always made from the same position relative to the position of the input sample. In adaptive sample replacement, the direction from which a sample value is to be taken to replace the input sample is determined as described above in connection with expressions (16) to (19).

In either case of sample replacement, the number of successive samples replaced is counted by a counter which forms a replacement limiter. Thus, as described above, the number of successive sample replacements is limited to a predetermined value and on reaching this predetermined value the concealment process is further modified to make use of the sample value already present in the field store and belonging to an earlier field.

It will be noted that the invention is not limited to any particular television system. Moreover, the invention is not limited to concealment of errors which have arisen in the course of recording and reproducing from a video tape recorder, but may be used in any situation where errors have arisen in processing, transmitting or handling a digital television signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of concealing errors in a digital television signal, which television signal represents a raster comprising a plurality of component sample signals corresponding respectively to sample positions along horizontal scan lines of a television picture made up of a plurality of such lines, the method comprising, in respect of each said sample signal which is in error:

selecting from a plurality of algorithms a preferred algorithm for correcting said error sample signal;
calculating a correction value for said error sample signal using said preferred algorithm;
substituting said correction value for said error sample signal so as to conceal the error; and
when the density of other error sample signals in the neighborhood of said error sample signal prevents said selection of said preferred algorithm; substituting the sample signal from a position in said raster adjacent to the position of said error sample signal for said error sample signal so as to conceal the error.

2. A method according to claim 1 wherein said adjacent position is selected in dependence on the positions of other error sample signals in the neighborhood of said error sample signal.

3. A method according to claim 2 wherein said adjacent position is in the direction in said raster from the position of said error sample signal determined by evaluation of directional accuracy factors $E_H$, $E_V$, $E_{D+}$ and $E_{D-}$ corresponding to the horizontal, vertical, positive diagonal and negative diagonal directions respectively of said raster, said factors being given by:

$$E_H = |K_H[S_{0,-2} - S_{0,-1}]/K_h|$$

$$E_V = |K_V[S_{-2,0} - S_{-1,0}]/K_v|$$

$$E_{D+} = |K_D[S_{-2,2} - S_{-1,1}]/K_{d+}|$$

$$E_{D-} = |K_D[S_{-2,-2} - S_{-1,-1}]/K_{d-}|$$

where:
$K_H$, $K_V$ and $K_D$ are respective spatial weighting coefficients which are proportional to the distances between the two sample positions used in the respective expression;
$S_{m,n}$ is the value of the sample signal in lime m at position n relative to said error sample signal $S_{0,0}$; and
$K_h$, $K_v$, $K_{d+}$ and $K_{d-}$ are error weighting coefficients for the horizontal, vertical, positive diagonal and negative diagonal directions respectively and which are determined in dependence on whether none, one or two of the sample signals used in the respective expression are in error.

4. A method according to claim 2 wherein the number of successive said substitutions from an adjacent position of the same sample signal is limited to a predetermined maximum.

5. A method according to claim 2 wherein said sample signals are stored in a field store until over-written by a later said sample signal, the number of successive said substitutions from an adjacent position of the same sample signal is limited to a predetermined maximum, and on occurrence of said limitation, the sample signal already stored at the address in said field store corresponding to the position of said error sample signal remains without being over-written.

6. A method according to claim 1 wherein said selection of a preferred algorithm comprises:

using a first algorithm to calculate from available sample signals the expected value of a first sample signal corresponding to a first sample position adjacent to the sample position of said error sample signal;
checking said expected value of said first sample signal against the actual value of said first sample signal;
using a second algorithm to calculate from available sample signals the expected value of a second sample signal corresponding to a second sample position adjacent to the sample position of said error sample signal;
checking said expected value of said second sample signal against the actual value of said second sample signal; and
selecting one of said first and second algorithms in dependence on the results of said checking steps and using said selected algorithm to calculate from available sample signals said corrected value of said error sample signal;
said first and second algorithms using available sample signals located along respective different directions of said raster.

7. Apparatus for concealing errors in a digital television signal, which television signal represents a raster comprising a plurality of component sample signals corresponding respectively to sample positions along horizontal scan lines of a television picture made up of a plurality of such lines, the apparatus comprising:

means operative in respect of each said sample signal which is in error to select from a plurality of algorithms a preferred algorithm for correcting said error sample signal;
means for calculating a correction value for said error sample signal using said preferred algorithm;
means for substituting said correction value for said error sample signal so as to conceal the error; and
means operative when the density of other error sample signals in the neighborhood of said error sample signal prevents said selection of said preferred algorithm, to substitute the sample signal from a position in said raster adjacent to the position of said error sample signal for said error sample signal so as to conceal the error.

8. Apparatus according to claim 7 wherein said adjacent position is selected in dependence on the positions of other error sample signals in the neighborhood of said error sample signal.

9. Apparatus according to claim 8 wherein said adjacent position is in the direction in said raster from the position of said error sample signal determined by evaluation of directional accuracy factors $E_H$, $E_V$, $E_{D+}$ and $E_{D-}$ corresponding to the horizontal, vertical, positive diagonal and negative diagonal directions respectively of said raster, said factors being given by:

$$E_H = |K_H[S_{0,-2} - S_{0,-1}]/K_h|$$

$$E_V = |K_V[S_{-2,0} - S_{-1,0}]/K_v|$$

$$E_{D+} |K_D[S_{-2,2} - S_{-1,1}]/K_{d+}|$$

$$E_{D-} = |K_D[S_{-2,-2} - S_{-1,-1}]/K_{d-}|$$

where:

$K_H$, $K_V$ and $K_D$ are respective spatial weighting coefficients which are proportional to the distances between the two sample positions used in the respective expression;

$S_{m,n}$ is the value of the sample signal in line m at position n relative to said error sample signal $S_{0,0}$; and $K_h$, $K_v$, $K_{d+}$ and $K_{d-}$ are error weighting coefficients for the horizontal, vertical, positive diagonal and negative diagonal directions respectively and which are determined in dependence on whether none, one or two of the sample signals used in the respective expression are in error.

10. Apparatus according to claim 8 comprising counter means for limiting the number of successive said substitutions from an adjacent position of the same sample signal to a predetermined maximum.

11. Apparatus according to claim 8 comprising a field store in which said sample signals are stored until overwritten by a later said sample signal, and counter means for limiting the number of successive said substitutions from an adjacent position of the same sample signal to a predetermined maximum, on occurrence of said limitation, the sample signal already stored at the address in said field store corresponding to the position of said error sample signal remaining without being over-written.

12. Apparatus according to claim 7 wherein said means operative to select a preferred algorithm comprises:

means operative in respect of each said sample signal which is in error to use a first algorithm to calculate from available sample signals the expected value of a first sample signal corresponding to a first sample position adjacent to the sample position of said error sample signal;

means to check said expected value of said first sample signal against the actual value of said first sample signal;

means to use a second algorithm to calculate from available sample signals the expected value of a second sample signal corresponding to a second sample position adjacent to the sample position of said error sample signal;

means to check said expected value of said second sample signal against the actual value of said second sample signal; and means to select one of said first and second algorithms in dependence on the results of said checking steps and using said selected algorithm to calculate from available sample signals said corrected value of said error sample signal;

said first and second algorithms using available sample signals located along respective different directions of said raster.

13. A method of concealing errors in a digital television signal, which television signal represents a raster comprising a plurality of component sample signals corresponding to respective sample positions along horizontal scan lines of a television picture made up of a plurality of such lines, the method comprising, in respect of each said sample signal which is in error, the steps of:

generating a plurality of algorithms for potentially correcting said error sample signal;

selecting one of said algorithms as better suited than the others for correcting said error sample signal;

determining the density of other error sample signals adjacent said error sample signal; and substituting for said error sample signal, in response to the determination of the density of said other error sample signals, either a correction sample signal related to said selected algorithm or a sample signal from a position in said raster adjacent to the position of said error sample signal, whereby to correct said error.

14. The method of claim 13; wherein said step of substituting in response to said determination includes the step of selecting said adjacent position in dependence on the positions of other error sample signals adjacent said error sample signal.

15. The method of claim 14; wherein said step of substituting in response to said determination includes the step of substituting the same signal from an adjacent position fewer than a predetermined number of times.

16. The method of claim 14; and further comprising the steps of:

storing said sample signals in field store means;

counting the number of successive substitutions from an adjacent position of the same sample signal; and selectively overwriting said sample signals stored in said field store means with a later sample signal, said sample signal already stored in said field store means corresponding to the portion of said error sample signal remaining without being overwritten when said number of successive substitutions exceeds a predetermined number.

17. The method of claim 14; wherein said step of selecting said adjacent position includes the step of determining the direction in said raster from the position of said error sample signal by calculating directional accuracy factors $E_H, E_V, E_{D+}$ and $E_{D-}$ corresponding to the horizontal, vertical, positive diagonal and negative diagonal directions, respectively, of said raster, said factors being given by:

$$E_H = |K_H[S_{0,-2} - S_{0,-1}]/K_h|$$

$$E_V = |K_V[S_{-2,0} - S_{-1,0}]/K_v|$$

$$E_{D+} = |K_D[S_{-2,2} - S_{-1,1}]/K_{d+}|$$

$$E_D = |K_D[S_{-2,-2} - S_{-1,-1}]/K_{d-}|$$

where:

$K_H$, $K_V$ and $K_D$ are respective spatial weighting coefficients which are proportional to the distances between the two sample positions used in the respective expression;

$S_{m,n}$ is the value of the sample signal in line m at position n relative to said error sample signal $S_{0,0}$; and $K_h$, $K_v$, $K_{d+}$ and $K_{d-}$ are error weighting coefficients for the horizontal, vertical, positive diagonal and negative diagonal directions, respectively, and which are determined in dependence on the number of the sample signals used in the respective expression which are in error.

18. The method of claim 13; wherein said step of selecting one of said correcting error sample signals comprises the steps of:

generating from available sample signals an expected value signal for a first sample signal corresponding to a first sample position adjacent to the sample position of said error sample signal;

comparing said expected value signal for said first sample signal against the actual value signal for said first sample signal to generate a first comparison signal;

generating from available sample signals an expected value signal for a second sample signal corresponding to a second sample position adjacent to the sample position of said error sample signal;

comparing said expected value signal for said second sample signal against the actual value signal for said second sample signal to generate a second comparison signal; and selecting one of said expected value signals for said first and second sample signals in response to said first and second comparison signals to generate from available sample signals said corrected value of said error sample signal;

said expected value signals for said first and second sample signals using available sample signals located along respective different directions of said raster.

19. Apparatus for concealing errors in a digital television signal, which television signal represents a raster comprising a plurality of component sample signals corresponding to respective sample positions along horizontal scan lines of a television picture made up of a plurality of such lines, the apparatus comprising, in respect of each said sample signal which is in error:

means for generating a plurality of algorithms for potentially correcting said error sample signal;

means for selecting one of said algorithms as better suited than the others for correcting said error sample signal; and means for determining the density of other error sample signals near said error sample signal and for substituting, in response to such determination, either a correction sample signal related to said selected algorithm or a sample signal from a position in said raster adjacent to the position of said error sample signal for said error sample signal so as to conceal the error.

20. The apparatus of claim 19; wherein said means for determining includes means for selecting said adjacent position in dependence on the positions of other error sample signals adjacent said error sample signal.

21. The apparatus of claim 20; wherein said means for selecting includes means for calculating said adjacent position in the direction in said raster from the position of said error sample signal by calculating directional accuracy factors $E_H$, $E_V$, $E_{D+}$ and $E_{D-}$ corresponding to the horizontal, vertical, positive diagonal and negative diagonal directions, respectively, of said raster, said factors being given by:

$$E_H = |K_H[S_{0,-2} - S_{0,-1}]/K_h|$$

$$E_V = |K_V[S_{-2,0} - S_{-1,0}]/K_v|$$

$$E_{D+} = |K_D[S_{-2,2} - S_{-1,1}]/K_{d+}|$$

$$E_{D-} = |K_D[S_{-2,-2} - S_{-1,-1}]/K_{d-}|$$

where:

$K_H$, $K_V$ and $K_D$ are respective spatial weighting coefficients which are proportional to the distances between the two sample positions used in the respective expression;

$S_{m,n}$ is the value of the sample signal in line m at position n relative to said error sample signal $S_{0,0}$; and $K_h$, $K_v$, $K_{d+}$ and $K_{d-}$ are error weighting coefficients for the horizontal, vertical, positive diagonal and negative diagonal directions, respectively, and which are determined in dependence on the number of the sample signals used in the respective expression which are in error.

22. The apparatus of claim 20; further comprising counter means for limiting the number of successive said substitutions from an adjacent position of the same sample signal to a predetermined maximum.

23. The apparatus of claim 20; further comprising field store means for storing said sample signals until over-written by a later said sample signal, and counter means for limiting the number of successive said substitutions from an adjacent position of the same sample signal to a predetermined maximum, and on occurrence of said limitation, the sample signal already stored at the address in said field store means corresponding to the position of said error sample signal remaining without being over-written.

24. The apparatus of claim 19; wherein said means for selecting one of said algorithms comprises:

means operative in respect of each said sample signal which is in error for calculating from available sample signals an expected value signal for a first sample signal corresponding to a first sample position adjacent to the sample position of said error sample signal;

means for comparing said expected value signal for said first sample signal with an actual value signal for said first sample signal to generate a first comparison signal;

means for calculating from available sample signals an expected value signal of a second sample signal corresponding to a second sample position adjacent to the sample position of said error sample signal;

means for comparing said expected value signal for said second sample signal with an actual value signal for said second sample signal to generate a second comparison signal; and means for selecting one of said expected value signals for said first and second sample signals in dependence on the results of said first and second comparison signals to generate from available sample signals said corrected value of said error sample signal;

said expected value signals for said first and second sample signals using available sample signals located along respective different directions of said raster.

* * * * *